United States Patent [19]

Lawrence et al.

[11] Patent Number: 4,528,063
[45] Date of Patent: Jul. 9, 1985

[54] METHOD FOR REFINISHING RIGID DATA STORAGE DISCS

[75] Inventors: John E. Lawrence, Cupertino; Lloyd L. Barnes, Jr., Campbell, both of Calif.

[73] Assignee: Winchester Disc, Inc., Milpitas, Calif.

[21] Appl. No.: 620,961

[22] Filed: Jun. 15, 1984

[51] Int. Cl.³ .......................... C23F 1/02; B44C 1/22; C03C 15/00; C03C 25/06
[52] U.S. Cl. .......................................... 156/626; 134/3; 156/645; 156/651; 156/656; 156/664; 156/667
[58] Field of Search ............... 156/626, 645, 655, 656, 156/664, 667, 651; 134/3, 41; 252/79.2

[56] References Cited

U.S. PATENT DOCUMENTS

| 3,003,967 | 10/1961 | Brady et al. | 156/667 |
| 3,923,567 | 12/1975 | Lawrence | 156/645 |
| 4,439,289 | 3/1984 | Viglione | 134/3 X |
| 4,475,981 | 10/1984 | Rea | 156/664 X |

Primary Examiner—William A. Powell
Attorney, Agent, or Firm—Thomas E. Schatzel

[57] ABSTRACT

A method for refinishing rigid data storage discs for recoating including the steps of removing a magnetically alterable coating and its sub-interfacing material from rigid data storage discs to expose disc substrates, inspecting the substrate for surface discontinuities, measuring the thickness and flatness of the substrates, resurfacing the surfaces of the substrates to remove surface unevenness and surface discontinuities, polishing the surfaces of the substrates to produce a visually mar-free flat substrates, and rinsing and drying the substrate before recoating.

20 Claims, 3 Drawing Figures

Fig_1

METHOD FOR REFINISHING RIGID DATA STORAGE DISCS

BACKGROUND OF THE INVENTION

1. Field of the Invention

The present invention relates generally to defective rigid data storage discs for use in hard disk drives and more particularly to a method for refinishing such defective discs.

2. Description of the Prior Art

Rigid data storage discs consist of a thin magnetically alterable coating adhered directly or indirectly to a relatively inflexible substrate having two planar surfaces. Typically the coating is of either a ferric oxide or a "magnetic nickel" film, while the substrate is usually aluminum.

Rigid data storage discs are commonly utilized in hard disk drives in conjunction with digital computers. The disc is the media upon which desired data is recorded and from which such data is retrieved. In hard disk drives the discs are mounted to rotate at relatively high speeds while read/write heads travel about the planar surfaces of the discs. The rotation of the disc creates air bushings about the planar surfaces of the discs. It is on these air bushings that the read/write heads float about the disc surfaces. The air bushings are very thin allowing the read/write heads to travel in close proximity to the surfaces of the discs.

Due to the nature of the air bushings the planar surfaces of the discs must be uniformly flat. Uneven disc surfaces result in the read/write head contacting the disc coating or "crashing" into the disc. Such "crashing" damages both the read/write head and the disc resulting in unacceptable disk drive performance.

Further, poor disk drive performance results if the coating is not uniformly applied onto the substrate or if the surfaces of the substrate have imperfections under the coating such as inclusions, pits, scratches, or other discontinuities. Discs with improperly applied coatings or with imperfect planar surfaces do not store or reproduce data in accordance with their design and are unacceptable for most computer data storage applications. Similarly, discs exhibiting roughness in the substrate surface or coating texture are unacceptable for most disk drive application.

Discs having coating or substrate imperfections are commonly known as "defective" discs. In some situations such discs may be recycled for future use if the defective coating or substrate surface imperfections can be eliminated and the substrate recoated. The preparation of a disc for recoating is referred to as "refinishing".

The inventors know of no comprehensive method in the prior art for refinishing rigid data storage discs that results in high yields of refinished discs suitable for recoating. The inventors are aware of a prior attempt to refinish rigid data storage discs by stripping the magnetically alterable coating from the disc using acid and then attempting to recoat the disc. Additionally, the inventors are aware of a prior effort to remove the magnetically alterable coating from the substrate via grinding operations. Both the acid removal refinishing process and the grinding process have numerous disadvantages.

One disadvantage with the prior art acid removal approach is that such results in etching or pitting of the substrate surface resulting in a decoated substrate unacceptable for recoating in the as-stripped condition.

Another disadvantage of the prior art acid removal approach is that it unpredictably leaves surface contaminants resulting in an inability to refinish such discs according to the teachings of the prior art.

Another disadvantage of the prior art acid approach is that it does not eliminate substrate surface unevenness resulting in defective discs even after recoating.

Another disadvantage of the prior art acid removal approach is that such does not eliminate substrate surface roughness resulting in defective discs after recoating.

A further disadvantage of the prior art in the use of the grinding method to remove the magnetically alterable disc coating is that it produces scratches, grooves and other surface irregularities in the substrate making its surfaces unacceptable for recoating.

A further disadvantage of the prior art grinding method is that it typically removes large quantities of substrate surface material reducing the thickness of the substrate below an acceptable thickness resulting in disc substrates unacceptable for recoating.

Another disadvantage of the prior art grinding method is that it leaves coated media on the outer edge of the disc resulting in the substrates not being suitable for recoating.

A further disadvantage of the prior art grinding method is that it produces disc substrates having improperly rounded edges unacceptable for recoating.

Another disadvantage of the prior art grinding method is that it does not produce stress-relieved substrate surfaces. Nonstress-relieved substrate surfaces can result in substrate flux causing an uneven substrate due to stress induced substrate warping. Uneven substrates are unacceptable for recoating.

SUMMARY OF THE PRESENT INVENTION

It is therefore an object of the present invention to provide a method for refinishing rigid data storage discs which is commercially practical.

Another object of the present invention is to provide a method for refinishing rigid data storage discs which yields disc substrates that are within specified thickness specifications for recoating.

Another object of the present invention is to provide a method for refinishing rigid data storage discs which yields disc substrates free of all visible disc surface imperfections, such as pits, grooves, scratches or other irregularities.

Another object of the present invention is to provide a method for refinishing rigid data storage discs which yields substrates having a greater flatness than the as-received defective media disc.

Another object of the present invention is to provide a method for refinishing rigid data storage discs which are free of process-induced surface stress.

Another object of the present invention is to provide a method for refinishing rigid data storage discs which yields disc substrates having chemically clean surfaces for recoating.

Another object of the present invention is to provide a method for refinishing rigid data storage discs which economically removes all presently known ferric oxide coatings and or magnetic thin film (electroless or sputtered) "nickel" coatings from disc substrates.

Another object of the present invention is to provide a method for refinishing rigid data storage discs which does not result in unnecessary rounding of disc substrate edges.

Briefly, a preferred embodiment of the method of the present invention comprises the operations of chemically treating and possibly heating rigid data storage discs to remove their magnetically alterable coatings without significantly etching or pitting their substrates, rinsing and drying the coating-free substrates, measuring the clean substrates for thickness and flatness while inspecting the substrate surfaces for roughness and inclusions, and comparing the thickness and flatness measurements with preselected thickness and flatness specifications.

Substrates with measurements less than a preselected thickness, are discarded from the process while substrates with flatness measurements greater than a preselected flatness are resurfaced in a lathe until the desired flatness is achieved. Substrates determined to be too rough or that have surface inclusions are also resurfaced to render such substrate surfaces uniformly flat and free of visual inclusions. Subsequent to resurfacing, the substrates are polished to create chemically clean visually mar-free stress-relieved surfaces. After polishing the substrates are rinsed in deionized water and dried in a Class 100 clean environment to remove all excess resurfacing or polishing material and prevent substrate surface contamination. The dried substrates are then subjected to a final visual surface inspection to detect surface imperfections and to a final measurement operation to detect non-flat or unacceptably thin substrates. All substrates found to have surface imperfections, non-flat surfaces or substrates determined to be unacceptably thin may be discarded after final measurement and inspection. Substrates found to be visually free from surface imperfections and are of requisite thickness and flatness are retained as refinished discs suitable for recoating and subsequent reuse.

One advantage of the method of the present invention is that a large number of rigid data storage discs can be economically refinished for recoating.

Another advantage of the method of the present invention is that all refinished discs are of a predetermined acceptable thickness for recoating and future use.

Another advantage of the method of the present invention is that all refinished discs are free of visual surface imperfections.

Another advantage of the method of the present invention is that all refinished discs have stress relieved chemically clean surfaces suitable for recoating.

Another advantage of the method of the present invention is that all presently known ferric oxide type disc coatings can be easily removed from the disc substrate without permanent damage to the disc substrate.

Another advantage of the method of the present invention is that no detrimental rounding of the disc substrate edges results.

Another advantage of the method of the present invention is that all refinished discs have uniformly flat surfaces suitable for recoating.

These and other objectives and advantages of the present invention will no doubt become obvious to those of ordinary skill in the art after having read the following detailed description of the preferred embodiment illustrated in the drawing.

IN THE DRAWING

DETAILED DESCRIPTION OF THE PREFERRED EMBODIMENT

Figure 1:
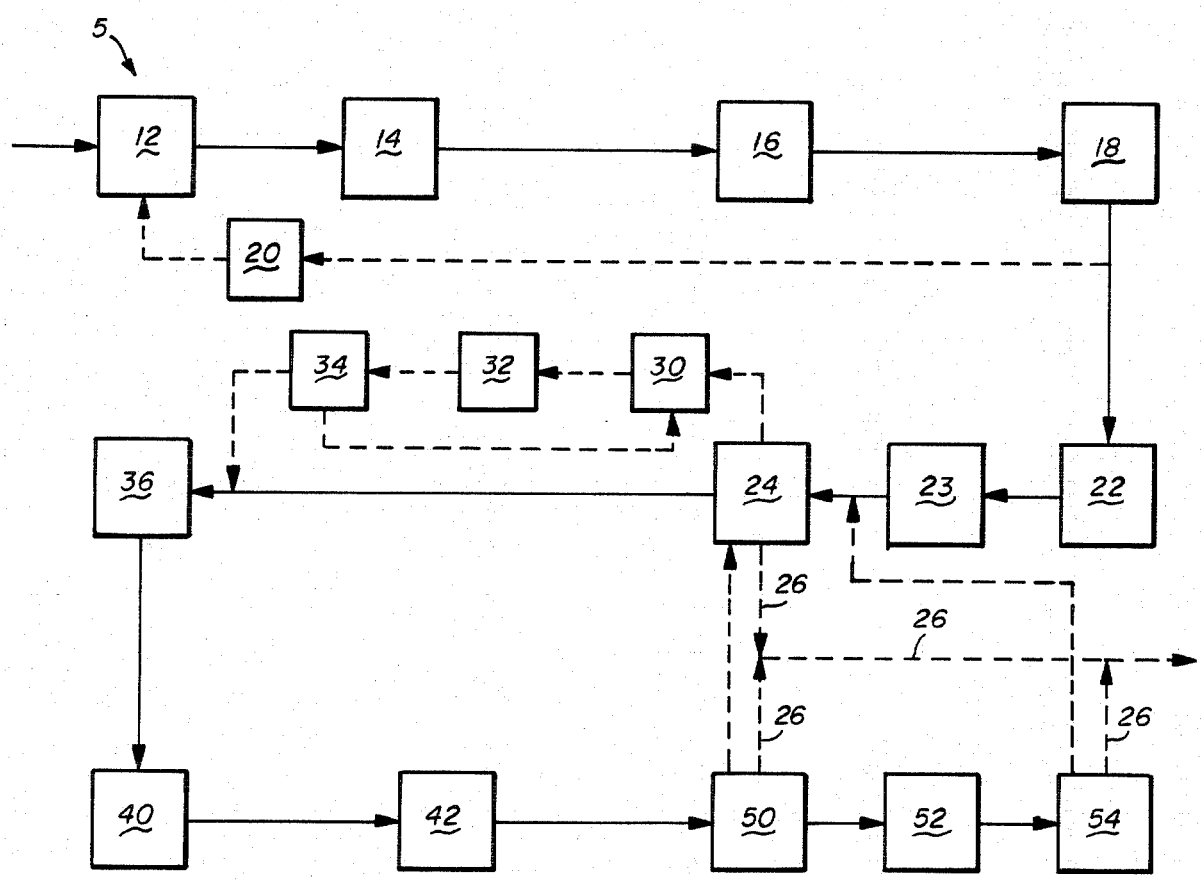
FIG. 1 is an overall block diagram illustrating the method for refinishing rigid data storage discs in preparation for recoating according to the present invention.
Figure 2:
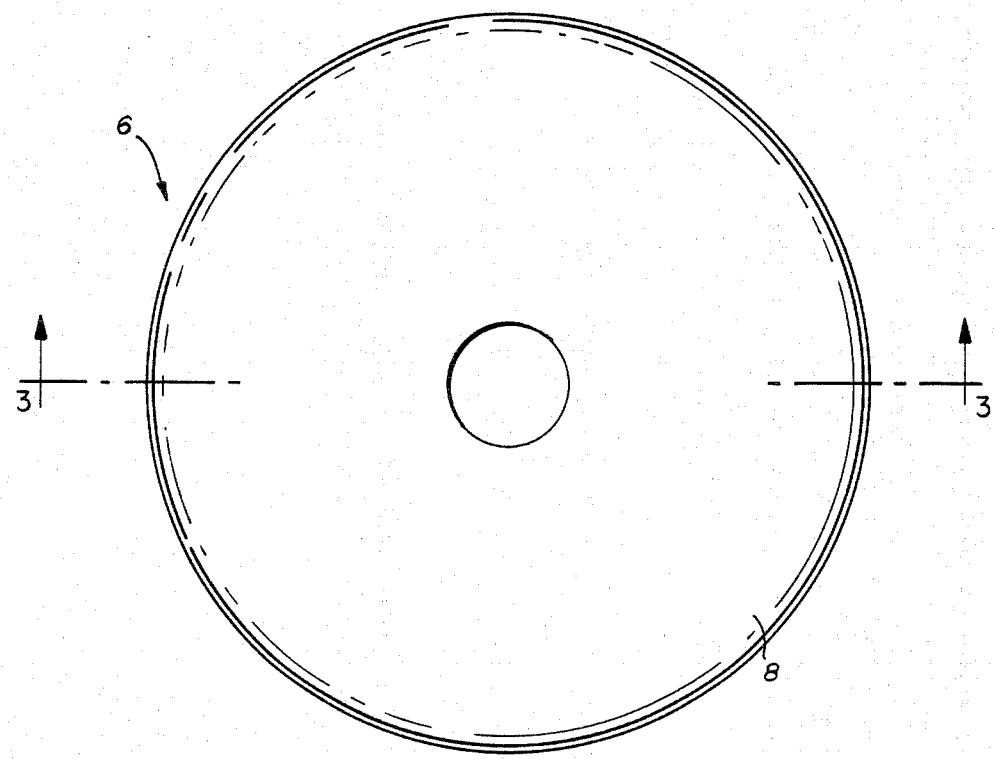
FIG. 2 illustrates a top elevational view of a rigid storage disc.
Figure 3:
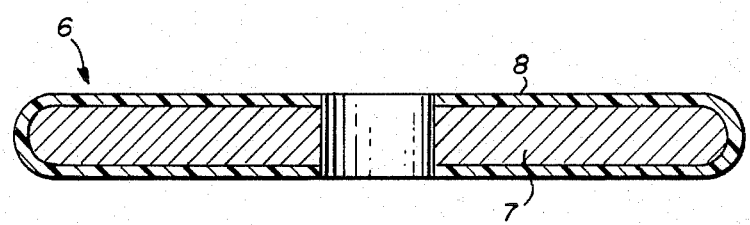
FIG. 3 illustrates a sectional view of the rigid storage disc of FIG. 2 taken along lines 3—3.

FIG. 1 is an overall block diagram referred to by general reference character 5, illustrating the method for refinishing rigid data storage discs. Rigid data storage discs referred to by general reference character 6 and illustrated in FIG. 2 and FIG. 3 include a relatively inflexible substrate 7, such as aluminum, to which a magnetically alterable coating 8 is adhered. Coating 8 is typically ferric oxide or a non-magnetic nickel covered by "magnetic nickel".

The refinishing method 5 begins by the removal of the coating 8 from the substrate 7 in a removing step 12. During removing step 12 the rigid data storage disc 6 is immersed in a heated acid solution for a predetermined period of time. When the coating 8 is ferric oxide, the acid solution typically comprises sulphuric acid. The sulfuric acid solution is heated to temperatures between 20° C. (68° F.) and 120° C. (248° F.). Experimentation has determined that removal of disc coating 8 in the acid solution is temperature dependent. The lower the temperature of the acid solution the slower disc coating 8 is removed in step 12. Conversely, the higher the temperature of the acid solution the faster disc coating 8 is stripped from substrate 7. It is recommended that the acid be heated to 50° C. (122° F.) to strip coating 8. Under these conditions coating 8 will usually be removed in about fifteen seconds. Use of higher temperatures to induce shorter removal times can result in uncontrollable coating removal causing pitting and/or etching of substrate 7. Such damage to substrate 7 is to be avoided.

In some applications ferric oxide coating 8 does not readily strip from substrate 7 in coating removal step 12. The failure of the ferric oxide coating 8 to strip is due to its molecular structure. When such a disc coating 8 is encountered after a first rinse step 14, and a first inspection step 16 the non-stripable coating 8 is dried in a drying step 18 and subjected to a heating step 20. During heating step 20, disc 6 is placed in an oven, (not shown) heated to about 248° C. (480° F.), and allowed to bake for approximately twenty minutes. During heating step 20 the ferric oxide disc coating 8 undergoes a polymeric change. After approximately twenty minutes the disc 6 is removed from the oven and reprocessed through coating removal step 12, rinse step 14 and inspection step 16, wherein ferric oxide coating 8 will now strip from the disc substrate 7 without further manipulations.

When coating 8 is a nickel film, discs 6 are subjected to a solution of predominantly nitric acid (not shown) in coating removal Step 12. Acid concentrations of between thirty and fifty percent are recommended. To prevent etching and pitting of disc substrate 7 during coating removal step 12 a buffer (not shown) is added to the acid solution. The use of such a buffer is essential when disc substrates 7 are aluminum. Such substrates 7 are easily damaged by contact with nitric acid. Experimentation has determined that a buffered nitric acid solution suitable for use in coating removal step 12 is marketed by MacDermid Incorporated of Waterbury, Conn. under the designation "Metex ® Metal Stripper SS.No2". Alternative, buffered nitric acid solutions having similar functional affectiveness are marketed by other companies besides MacDermid, Inc.

Nickel coating removal, like ferric oxide coating removal, is time temperature usage dependent. The same acid solution temperatures discussed for removing ferric oxide coating 8 should be employed for the removal of nickel coatings 8 from the disc substrates 7.

Upon completion of coating removal step 12 the substrates 7 are subjected to first rinsing step 14. First rinsing step 14 includes bathing substrates 7 in a rinsing liquid (not shown), such as water, to remove residue acid (not shown). When water (not shown) is used as the rinsing liquid the water should be at approximately room temperature, 21° C. (70° F.), and substrate 7 should be subjected to first rinsing step 14 for approximately five minutes.

Due to the differing means by which disc coatings 8 are applied to disc substrates 7, discs 6 must be inspected after undergoing coating removal step and first rinse step 14 in inspection step 16 to determine when coating removal step 12 should be terminated. Furthermore, first inspection step 16 is utilized to determine if heating step 20 is necessary when ferric oxide coatings 8 are being removed. During first inspection step 16 disc 6 is inspected to determine if substrate 7 is free of disc coating 8. In the case of nickel coated discs 6 this is indicated when the substrate 7 is free of all blackish areas. When substrates 7 are coating free, step 12 is terminated.

Subsequent to rinsing step 14 and inspection step 16, substrates 7 are dried in a first drying step 18. During first drying step 18 substrates 7 are immersed in a drying agent (not shown), such as heated water, for a short time period. If water is used as the drying agent it is heated to approximately 43°–46° C. (110°–115° F.) and the substrate 7 is exposed to such for a predetermined time period. When substrates are aluminum, exposure to the heated water is kept to a minimum, approximately five seconds. Longer exposure to heated water may result in pitting or etching of the aluminum making the substrate 7 unacceptable for recoating. After exposure to the drying agent, the agent is allowed to evaporate off the substrate 7. Once the drying agent has evaporated, substrate 7 is free of residue acid and first drying step 18 is terminated.

After first drying step 18, substrates 7 are measured for thickness and surface flatness in a first measuring step 22. The thickness of substrates 7 are measured to determine an actual thickness value, while the flatness of the surface of disc 6 is measured to determine an actual flatness value. Actual flatness values are often determined for both planar surfaces of disc 6. Both flatness and thickness are measured on an ADE type non-contact gauge.

During first measurement step 22 substrates 7 are also subjected to a second inspection step 23. During second inspection step 23 the planar surfaces of substrates 7 are examined for roughness or surface inclusions such as pits, scratches, or grooves, and for an incomplete removal of coated materials.

After measurement step 22 and second inspection step 23 the actual thickness and flatness values are compared to predetermined acceptable thickness values and flatness values in a first comparison step 24.

In five and a quarter inch disc applications the predetermined thickness value is typically seventy-four thousandth of an inch plus or minus one thousandths of an inch or seventy-five thousandths of an inch plus or minus one thousandths of an inch. The predetermined flatness values require substrate 7 surfaces to have thickness variations of less than or equal to two thousandths of an inch.

Subsequent to first comparison step 24 all substrates 7 determined to be unacceptable for refinishing are rejected in a first discard step 26. Unacceptable substrates 7 include those that are less than the predetermined thickness values, and have excessive surface roughness, or non-flatness or inclusions such that removal of such would reduce the thickness of the substrate 7 below the predetermined minimum thickness value.

Acceptable substrates 7, not rejected in discard step 26, progress through method 5 in one of two paths. Acceptable substrates 7 having surface inclusions, non-flatness or roughness are resurfaced in a resurfacing step 30. Resurfacing step 30 consists of placing substrates 7 in a lathe, and cutting a new surface on substrate 7 to remove the surface inclusions, roughness or non-flatness of the old surface. Experimentation has determined that use of a Dover type lathe having a flat diamond point turning within the range of approximately 2000–3000 RPM will resurface the majority of the substrate 7 in about fifteen to forty-five seconds per side. During resurfacing step 30 a lubricant is used to reduce friction and cool substrate 7. Testing has determined that use of a "kerosene" thinner as a resurfacing lubricant provides satisfactory results. Such a thinner is presently marketed by Chevron Corporation under a "Chevron 325" designation. Removal of aluminum in 0.2 millimeter increments per side is reconnected to avoid unnecessary substrate surface material removal.

Substrate 7 is degreased in a degreasing step 32 after resurfacing step 30 is complete. Degreasing step 32 removes resurfacing lubricant and other foreign material deposited on substrate 7 during refinishing step 30.

Subsequent to degreasing step 32 substrate 7 is reexamined in a third inspection step 34. During third inspection step 34 resurfaced substrate 7 is inspected for surface inclusions greater than 0.1 of a thousandths of an inch in depth. Substrate 7 with such surface inclusions greater than 0.1 thousandth of an inch in depth are reprocessed through resurfacing step 30 and degreasing step 32 until substrate 7 surface inclusions are less than 0.1 of a thousandths of an inch in depth. Substrate 7 may be remeasured at this time to ensure that such are not below acceptable thickness values for recoating.

Acceptable resurfaced substrates 7 and substrates 7 that did not require resurfacing are then polished in a polishing step 36. Polishing step 36 includes polishing both planar surfaces of substrate 7 to remove all visual surface inclusions less than 0.1 of a thousandths of an inch in depth. Polishing step 36 also provides a stress relief function for the substrate 7. To avoid future warping of substrate 7, due to internal substrate strain, polishing step 36 is carried out using dual action polishing equipment (not shown). Such equipment polishes both planar surfaces of substrate 7 simultaneously. To conserve time the polishing equipment should be capable of polishing more than one substrate 7 at a time. In five and one-fourth inch disk applications polishing equipment capable of polishing seven discs simultaneously has been utilized. The polishing equipment must also be capable of utilizing relatively hard polishing pads. Such pads include those marketed by Rodel Products Corp. of Scottsdale, Ariz. under the "Suba X", "Suba 204" and "Suba 205" designations. The use of relatively hard polishing pads ensure that undesirable substrate 7 rounding of edge is avoided while polishing substrate 7 to a visually scratch free surface is assured. Prevention of such edge rounding and scratch free surface finishing is not possible when the prior art approaches are utilized. Conventional polishing compounds can be used during polishing step 36.

After the surfaces of substrates 7 are polished in step 36 substrates 7 are introduced into a second rinsing step 40. Second rinse step 40 removes residue polishing compound and other foreign material from substrate 7 and is accomplished by using deionized water at room temperature 21° C. (70° F.) in cascade rinsing equipment (not shown). The cascade rinsing equipment constantly provides fresh water to rinse substrates 7. Use of fourteen (or greater) megohm deionized water in rinsing step 40 is recommended as such water will dissolve many types of surface contamination from substrates 7. To prevent air born contamination of the substrates 7, second rinse 40 is preformed under Class 100 clean room conditions.

After rinsing step 40, substrates 7 are subjected to a second drying step 42 for approximately five minutes. The second drying step 42 utilizes a spin rinse/dry concept wherein substrates 7 are rinsed in fourteen (or greater) megohm deionized water while revolving and then spun dry at approximately 3600 RPM. During the second drying step 40 substrates 7 are placed in a clean essentially particulate free environment. The clean gas could be nitrogen or a clean dry air. Second drying step 42 is also carried out under Class 100 clean room conditions.

In some instances a fourth inspection step 50, a second measurement step 52 and a second comparison step 54 may be desired to ensure that the refinished substrates 7 are acceptable for recoating. The fourth inspection step 50 is similar to the second inspection step 23. The surfaces of the substrate 7 are examined to detect visual surface discontinuities. Such an inspection is usually carried out under an overhead fluorescent light source in a dark room. If further refinishing is required, substrates may be resubjected to steps 24 through 50 at this time. Second measurement step 52 is identical to first measurement step 22 in that an ADE type non-contact gauge is used to determine actual thickness and flatness values for the substrate 7. Second comparison step 54 serves the same function as first comparison step 24, the actual thickness and flatness values for the substrates 7 are compared to predetermined thickness and flatness values to determine if substrates 7 are acceptable for recoating. As before, unacceptable substrates 7 may be resurfaced (utilizing steps 24 through 52), if feasible, or are rejected in discard step 26. Similarly, if fourth inspection step 50 reveals roughness or surface discontinuities, the defective substrate 7 may be resurfaced and repolished if feasible, or rejected.

Acceptable refinished substrates 7 from method 5 are then ready for recoating and future use.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method for refinishing data storage discs, comprising the steps of:
    removing from a data storage disc a coating adhered to a planar surface of a rigid substrate to expose the substrate surface;
    measuring the actual thickness and flatness of said substrate;
    inspecting said planar surface for surface discontinuities exceeding a predetermined depth;
    inspecting the texture of said planar surface for roughness exceeding a predetermined roughness value;
    comparing the actual thickness value of said substrate with a predetermined thickness value;
    comparing the actual flatness of said substrate with a predetermined flatness value;
    resurfacing said planar surface of those said substrate having actual flatness values greater than or equal to said predetermined flatness values to create resurfaced substrate having a planar surface of a flatness value less than said predetermined flatness value;
    polishing said resurfaced substrate and non-discarded substrate to create a visually discontinuity-free substrate without tapering the edges of said substrate beyond a predetermined level, whereby said predetermined level maintains and ensures that said substrate edges are sufficient to prevent transducer head contact with said substrate edges when said substrate is recoated and used in a data storage media device;
    rinsing said substrate with a rinsing fluid to remove residue foreign material from the substrate; and
    drying said substrate to remove residue rinsing fluid from said substrate whereby a chemically clean coating free substrate acceptable for future use in said data storage media device is created.

2. The method of claim 1 wherein
    the removal of the coating includes exposing said coating to a heated acid solution for a predetermined time period until said substrate is coating free.

3. The method of claim 2 wherein
    the coating includes ferric oxide, said acid solution includes sulfuric acid and is heated to at least 20° C. (68° F.), and said coating is exposed to the acid solution for at least fifteen seconds.

4. The method of claim 3 wherein
    said disc is inspected to determine if said substrate is free of the coating.

5. The method of claim 4 wherein
    said disc is heated for a predetermined time to cause a molecular change in the coating when the coating has not been removed by said acid solution after its first exposure, and then again exposing said disc to said heated acid solution.

6. The method of claim 5 wherein
    said coating free substrate is rinsed with a rinsing liquid to remove residue acid solution from said substrate and then dried to remove residue rinsing liquid from said substrate.

7. The method of claim 1 wherein
    the coating includes nickel, said substrate includes aluminum, and said acid solution includes nitric acid whereby said nickel coating is removed from said aluminum substrate without damaging said substrate surface.

8. The method of claim 7 wherein said solution is at least a forty-five percent solution of buffered nitric acid heated to at least 20° C. (68° F.); and said media is exposed to said solution for at least fifteen seconds to create a coating free substrate.

9. The method of claim 8 wherein the coating free substrate is rinsed in a rinsing liquid to remove residue acid from the surfaces of said substrate; and said rinsed substrate is dried to remove residue rinsing liquid.

10. The method of claim 1 wherein said chemically clean coating free substrate are remeasured to determine actual thickness and flatness values, the actual thickness and flatness values are compared to predetermined thickness and flatness values, and discarding those substrates having an actual thickness value less than the predetermined value, and discarding substrates having an actual flatness values in excess of the predetermined flatness value if resurfacing of the substrate would reduce the thickness of the substrate below the predetermined value; and resurfacing those substrates for which resurfacing would not cause the substrate to have an actual thickness value less than the predetermined thickness value.

11. The method of claim 10 including inspecting the surfaces of said chemically clean coating-free substrate for surface discontinuities and roughness;

discarding substrates having surface discontinuities greater than a predetermined depth; and resurfacing substrates having surface roughness in excess of a predetermined roughness value to create a substrate having surfaces free of visual discontinuities provided that resurfacing does not create a substrate with an actual thickness value less than the predetermined thickness value.

12. The method of claim 1 wherein said polished substrate is rinsed in a cascade rinse having at least fourteen megohm deionized water.

13. The method of claim 12 wherein said polished substrate is rinsed in at least a class 100 clean room environment to prevent airborne contamination of the surfaces of said substrate.

14. The method of claim 13 wherein said rinsed substrate is dried in a rinse/dry apparatus having at least fourteen megohm deionized water.

15. The method of claim 14 wherein said substrate is placed in a clean gas environment when said substrate is spun dry.

16. The method of claim 15 wherein said chemically clean coating-free substrate are remeasured to determine actual thickness and flatness values of the substrate, the actual thickness and flatness values are compared to predetermined thickness and flatness values, and discarding those substrates having an actual thickness values less than the predetermined value.

17. The method of claim 6 including inspecting the surfaces of said chemically clean coating-free substrate for surface discontinuities and roughness;

discarding substrates having surface discontinuities greater than a predetermined depth; and resurfacing substrates having surface roughness in excess of a predetermined roughness value to create a substrate having surfaces free of visual discontinuities.

18. The method of claim 17 wherein the data storage discs are rigid; and said substrate is disc shaped.

19. The method of claim 10 wherein said substrates are resurfaced in a lathe resurfacing process.

20. The method of claim 11 wherein said substrates are resurfaced in a lathe resurfacing process.

* * * * *